United States Patent [19]

Featherstone et al.

[11] 4,114,020

[45] Sep. 12, 1978

[54] METHOD OF JOINING TWO SHEET METAL PARTS

[75] Inventors: Harry Edwin Featherstone, Wooster; Walter Grant Sniff, Jr., Smithville, both of Ohio

[73] Assignee: Orrville Products, Inc., Orrville, Ohio

[21] Appl. No.: 809,911

[22] Filed: Jun. 24, 1977

Related U.S. Application Data

[63] Continuation-in-part of Ser. No. 760,919, Jan. 21, 1977.

[51] Int. Cl.² ............................................ B23K 9/00
[52] U.S. Cl. .............................. 219/137 R; 228/214; 228/240
[58] Field of Search ............. 219/137R; 228/214, 240, 228/241

[56] References Cited
FOREIGN PATENT DOCUMENTS 38,893 11/1971 Japan ..................................... 228/214

*Primary Examiner*—E. A. Goldberg
*Attorney, Agent, or Firm*—Meyer, Tilberry & Body

[57] ABSTRACT

A method of joining first and second sheet metal parts along a common seam formed from a first surface on the first part and a second surface generally matching the first surface and on the second part. These surfaces define therebetween random spaces of variable thickness when the surfaces are assembled in a generally abutting coextensive relationship. The method includes applying a non-hardenable layer of corrosion resistant material to at least one of the surfaces with the material being thixotropic, cohesive with the metal and capable of forming a heat insulating, pliable, coherent gel upon being subjected to a given temperature generally sufficient to melt the metal of the parts, placing the surfaces together to jointly form the common seam with the material filling the random spaces, holding the surfaces in the placed positions and then welding the surfaces together at a temperature at least as high as the given temperature along a weld line generally coextensive with the seam whereby a line of the gel of the material forms along and generally parallel to the weld line.

29 Claims, 13 Drawing Figures $C \ll 2a$
$C \ll 2b$
$C \ll a+b$

METHOD OF JOINING TWO SHEET METAL PARTS

This application is a continuation-in-part of prior copending application Ser. No. 760,919, filed Jan. 21, 1977. The copending application is incorporated by reference herein.

The present invention relates to the art of joining two sheet metal parts and more particularly to joining two sheet metal parts separated by a corrosion resistant material which remains between the parts at the joined seam after the assembly operation.

The invention is particularly applicable for gas or arc welding various sheet metal seams in the production of certain welded seams in a cab for a truck and it will be described with particular reference thereto; however, it is appreciated that the invention has much broader applications and may be used for joining two sheet metal parts at a common seam for a variety of different products by different welding techniques, such as spot welding.

BACKGROUND

In recent years, there has been a substantial amount of activity directed to increasing the life of assembled cabs and bodies for vehicles as well as other products subjected to corrosive atmospheres. Because of the intricacy of the various assembled parts and the relatively small thickness of the metal used, corrosion is becoming a substantial problem, the solution of which is now requiring a great outlay of time and money. The corrosion problem, for motor vehicles, has been compounded by an increase in the amount of salt and other chemicals being applied to the roadways in certain parts of the country. It is now a general objective of most manufacturers of motor vehicles to increase the total life of the vehicle body with respect to corrosion. At this time, it has been suggested that the steel used in the manufacture of vehicle bodies be galvanized or otherwise coated on one or both sides. Generally, the metal coating is on one side so that the other side may easily receive decorative coatings, such as paint. Also, assembled bodies are being dipped in a variety of substances and coated by electrolytic processes with materials which enhance the corrosion resistance characteristics of the body. Even with these various types of methods for attempting to reduce the corrosion of a vehicle body, additional material is required in certain inaccessible locations. This is often done by spraying additional corrosion reistant material into these areas of the body after assembly. All of these procedures have distinct disadvantages. For instance, the galvanizing of steel, or coating of steel with various metals, usually provides a coating on only one side. The painted side remains untreated. The electrical disposition process is quite expensive and must be controlled accurately for uniform results. As the process varies, it is possible to require further processing of bodies because of inferior coating by electrical disposition. These types of processes do not provide any substantial or long lasting protection at the seams between joints. In the electrical disposition process, coating is done after the parts are assembled. The same concept is true for various dipping processes. Thus, the seams of an assembled cab or body remain uncoated and can be the source of relatively rapid corrosion during adverse ambient conditions.

In an attempt to protect the seam area of an assembled body, it has been generally the practice to seal the seam at the external portions. This concept functioned on the belief that the exclusion of moisture from the seam would prevent corrosion. However, such procedures are not satisfactory since the moisture inhibiting provision of outside coatings is subsequently deteriorated to the point that moisture will migrate into the seam between assembled metal parts to cause rapid corrosion and combine with oxygen to cause corrosion.

In some instances, parts are painted before they are joined at the seams by welding. The paint forms a hardened surface which does not migrate from the welding zones in a welding process. Thus, the paint substantially increases the difficulty in obtaining a sound weld and creates inferior welding of the joint or seam. These prepainted parts are generally not successful in a welding operation for sheet metal joints or seams. To overcome this difficulty in spot welding, the paints have been provided with a powdered metal substance which reduces the resistivity of the paint in the seam area. This allowed spot welding through the seam by using the powdered metal as an electrically conductive path through the seam in the weld zone. This procedure was somewhat expensive and did not result in uniformly satisfactory spot welds. In addition, since the paint hardened on the two parts before welding of the seam, the welding operation, whether arc, gas or spot, could cause cracking of the paint. In addition, paint could crack during subsequent use along the periphery of any welded area, i.e. the spot nuggets of spot welding or the bead of gas or arc welding. Thus, this procedure of using paint for coating surfaces prior to welding of the seam is not universally used. In addition, prepainting of parts prior to welding causes handling difficulties and increases the complexity of subsequent decorative coating when the parts are to be used in components for motor vehicle cabs or bodies.

The invention of prior application Ser. No. 760,919, filed Jan. 21, 1977, relates to a new method of joining two sheet metal parts at a common seam, which method employs the selection of a corrosion resistant material having specific mechanical characteristics and then applying this material to at least one of the surfaces prior to welding of the joint. In this manner, the corrosion resistant material is sandwiched between the two sheet metal parts forming the seam to provide corrosion resistance within the seam itself. The present invention allows welding of a seam using a previously applied corrosion resistance material of the type forming a long term, self sealing corrosion resistant protection and is applicable for arc and flame or gas welding, as well as for spot welding.

In the invention of our prior application, Ser. No. 760,919, filed Jan. 21, 1977, there is disclosed the concept of seam welding two sheet metal parts together with an intermediate layer of non-hardening, high temperature corrosion resistant material. The material used in the invention has certain physical characteristics one of which is that it does not flow at relatively high temperatures up to 400° F to 440° F. Since the material does not flow at high temperatures, welding can be accomplished without loss of the material from between the two surfaces forming the welded seam. The prior disclosed invention, as well as the present invention, is applicable for use in relatively thin sheet metal parts. Relatively "thin" indicates that the sheet metal is aproximately 0.010 to 0.125 in thickness. The preferred embodiment of the previously disclosed invention involves the spot welding of two relatively thin sheet metal parts formed from the normal type of steel used in production of cabs and bodies for motor vehicles. Also, such process can be used for other metal parts, such as relatively thin aluminum sheet metal parts. In the preferred embodiment of the prior process and in the present invention, the thickness is 0.020 to 0.080. However, thicker parts can be processed by this invention.

THE INVENTION

In accordance with the present invention, there is provided a method of joining first and second sheet metal parts along a common seam formed by a first surface on the first part and a second surface generally matching the first surface and on the second part. These surfaces define therebetween random spaces of variable thickness when the surfaces are assembled in generally abutting coextensive relationship. In accordance with the method of the invention, a non-hardening layer of corrosion resistant material is applied to at least one of the surfaces. This material is thixotropic, cohesive with the metal of the parts and capable of forming a pliable, coherent gel upon being subjected to a given temperature generally sufficient to melt the metal of the parts. Thereafter, the surfaces are placed together to jointly form a common seam with the material filling the random spaces. When in this position, the surfaces are held and then welded together at a temperature at least as high as the given temperature and at a periphery defining weld area of the seam whereby a barrier of gel of the material forms along the periphery of the weld area. In accordance with one aspect of the invention, the welding step includes gas welding of the area whereby a weld bead is created and the barrier of gel extends generally parallel to this bead. In a like manner, the welding process could use arc welding to produce a bead extending along the seam, which bead is generally parallel to the gel barrier of material formed during the heating of the surrounding metal for welding same. During the heating operation, the corrosion resistant material forms a gel barrier and pulls away from the weld area a short distance determined by the heat pattern in the abutting sheet metal. This provides a somewhat clean metal surface for the welded joint.

In accordance with another aspect of the invention, the non-hardening layer of corrosion resistant material includes a suspension of a carrier, a corrosion resistant agent and a carrier solvent and is non-gravity flowable at a temperature above about 400° F.–440° F. In accordance with another aspect of the invention, the material is applied to the surfaces at a thickness exceeding about 6 mils, preferably a thickness exceeding about 10 mils. In practice, the thickness of the layer applied to one or both surfaces, when combined, is greater than the thickness of random spaces left between adjacent surfaces forming the seam being joined. In this manner, the spaces between the material are generally filled with the corrosion resistant material. In accordance with another aspect of the invention, the two surfaces are forced together to squeeze from between the surfaces excess corrosion resistant material prior to the welding operation which involves holding the metal parts in proper relationship during the welding operation. This can be done by a fixture or other arrangement.

In accordance with one aspect of the method of the present invention, the carrier of the corrosion resistant material is a metallo-organic complex. In accordance with another aspect, the metallo-organic complex or compound is used with a corrosion resistant agent that is a phosphate resin. The complex is often metallic base. In the preferred embodiment of the invention, the corrosion resistant material is anchor-Tuflex No. 23 produced by Jenkin-Guerin, Inc. of St. Louis, Mo.

By using the method as defined above, it is possible to weld two sheet metal parts forming a cab or body of a vehicle or other assembly with a coextensive intermediate layer of a rust inhibiting or corrosion preventing, nonhardenable material, which material extends along the periphery of the weld area formed during the welding process and prevents ingress of corrosive agents between the two assembled members from the inside of the assembled parts. The use of a non-hardenable corrosion resistant material between two welded sheet metal parts and a method which precludes the material from inhibiting the normal operation of the welding system solves many of the problems now being investigated by the motor vehicle and other industries. After welding has been completed and a non-hardenable corrosion resistant material is sandwiched between two generally flat, thin sheet metal parts, the total vehicle cab or other assembly may be subjected to normal rust inhibition. Consequently, the present invention relates to an improvement in a system for protecting the cab or other assembly, which system provides actual rust inhibiting material between the seams of a welded joint or seam. The material can be cleaned from any part by a solvent, such as an aromatic solvent for subsequent painting or other treatment of exposed surfaces. Thus, oozing of the material from the seam does not inhibit subsequent processing of the cab or other assembly, such as subsequent bath applications.

The primary object of the present invention is the provision of a method of joining first and second sheet metal parts along a common seam, which method and apparatus provides a non-hardening rust inhibiting or corrosion preventing layer between the two parts and at the seam.

Another object of the present invention is the provision of a method as defined above, which method employs a thixotropic corrosion resistant material which does not flow at high temperature and does not flow from between the parts during welding thereof, but progresses slightly from the welded area by action of heat generated during welding.

Still a further object of the present invention is the provision of a method for joining first and second sheet metal parts along the common seam by welding the two parts together which method employs the step of providing a thixotropic corrosion resistant material between the parts which material remains in the seam after welding thereof and which can be used for arc and flame welding.

Still a further object of the present invention is the provision of a method as defined above, which method provides an assembled part including two sheet metal parts welded together at a seam which seam is coated with a corrosion resistant material that is non-hardenable and remains in the seam and fills all spaces between the parts.

These and other objects and advantages will become apparent from the following description.

BRIEF DESCRIPTION OF DRAWINGS

In the specification, the following drawings are incorporated for illustrative purposes.

GENERAL DESCRIPTION OF THE INVENTION

Figure 1:
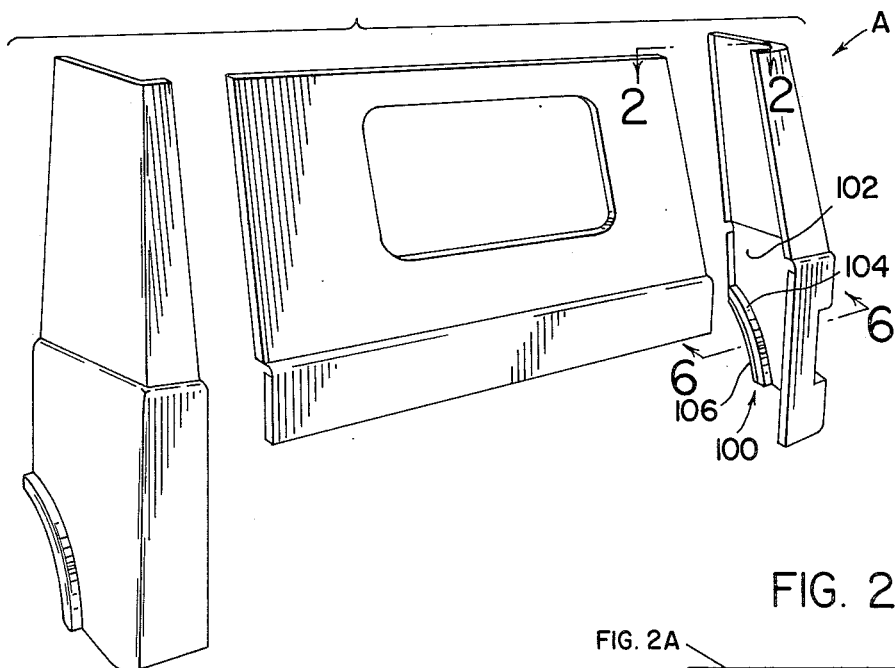
FIG. 1 is a pictorial view illustrating a portion of a truck cab using the present invention.
Figure 2:
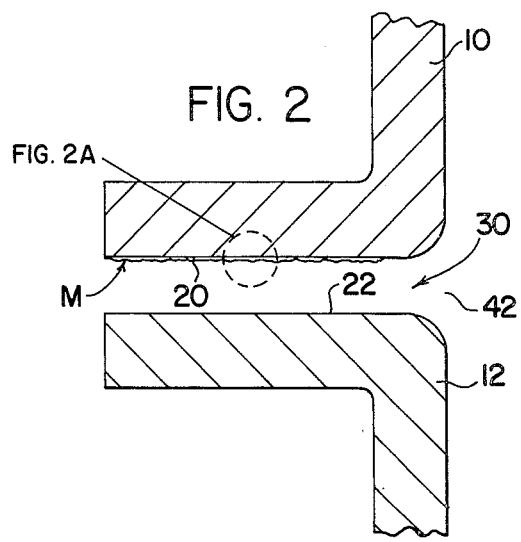
FIG. 2 is an enlarged cross-sectional view taken generally along line 2—2 of FIG. 1.
Figure 2A:
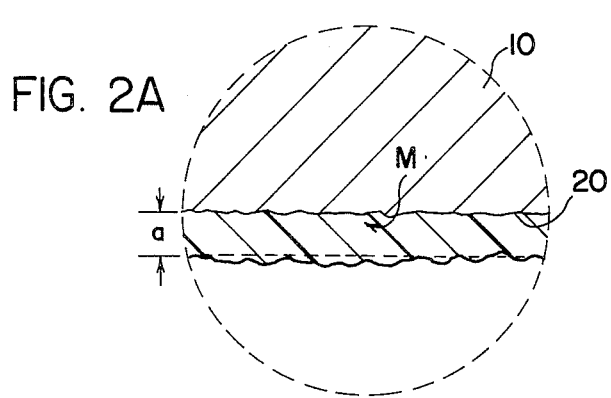
FIG. 2A is a magnified cross-sectional view of the circled area in FIG. 2.

Referring now to the drawings, wherein the showings are for the purpose of illustrating the preferred embodiments of the invention only, and not for the purpose of limiting same, FIG. 1 shows a cab A formed of sheet metal parts, two of which are parts 10, 12 each formed from 0.020–0.080 inch SAE 1010 steel. Each of these parts has a generally flat surface 20, 22, respectively, which define a seam 30 to be welded together. In accordance with the illustrated embodiment of the invention, a non-hardening rustproofing or corrosion resistant material M is provided with a thickness of at least about 6–10 mils on at least one of the surfaces 20, 22. In the illustrated embodiment, the material is applied to surface 20 prior to clamping the surfaces together and welding them along seam 30 to form a weld bead B. Thickness a shown in FIG. 2A represents the general thickness of the material M on surface 20. Before explaining the invention, some characteristics of the material M will be set forth. Sheets 10, 12 are sometimes not the same thickness.

CHARACTERISTICS OF CORROSION RESISTANT MATERIAL

In practicing the present invention, a corrosion resistant material having specific characteristics has been selected. This material generally includes a non-separable mixture or suspension of a thixotropic carrier, a corrosion inhibiting compound and a solvent for controlling the viscosity of the material. The corrosion resistant material used in the present invention was selected to have other physical properties. At temperatures of less than about 400° F to 400° F, the material does not flow or sag under gravity force influence. When the solvent is burnt away or heated to a temperature necessary for melting a metal in a welding operation, the material forms a pliable, coherent, heat insulating gel which forms a thermal barrier between the heat of combustion of the burning solvent and remaining portions of the material. The material should not harden after prolonged times, exceeding 6 to 8 weeks, as the solvent is progressively evaporated from the mixture. Also, the material has a mechanical affinity for metal much like a heavy grease and may be applied with the metal surface in any position. Although known corrosion resistant material meeting these characteristics can be used, in accordance with the present invention, Anchor Tuflex No. 23 material was developed for use in the present invention and has the general properties set forth in this disclosure. This material is a metallo-organic compound or carrier having a phosphate resin corrosion inhibit and is marketed by Jenkin-Guerin Inc. of St. Louis, Missouri. The material has a density of 7.7 pounds per gallon, a flash point of 124° F (ASTM D-93 PMCC), 56% by weight of non-volatiles, and no gravity induced flow at 440° F. The material remains flexible at all operating temperatures to prevent undercutting by corrosion and the propagation of rust or corrosion under protective coatings. The base metal is calcium. When subjected to temperature necessary to weld metal, such as steel, the material forms the above mentioned gel and is generally cleared from the direct welding areas so that it does not affect the weld operation.

WELDING OPERATION

Figure 3:
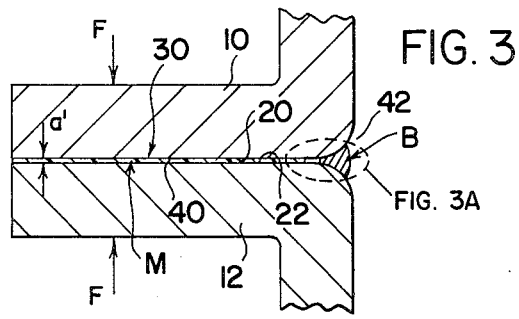
FIG. 3 is an enlarged view showing the weld bead and corrosion resistant material between two sheet metal parts and the sheet metal parts, in cross-section.
Figure 3A:
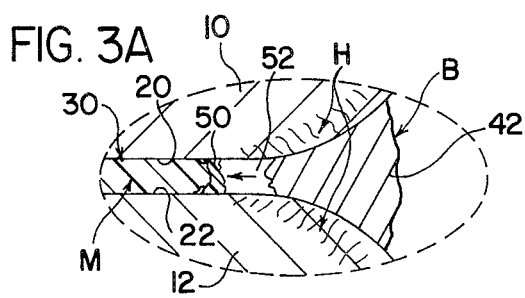
FIG. 3A is a magnified cross-sectional view of the circled area in FIG. 3 showing the gel barrier formed on the exposed portion of the corrosion resistant material during heating of the assembled parts for the purpose of welding.

As is well known, surfaces 20, 22 are not truly flat and a gap 40 as shown in FIG. 3 exists between these two parts when they are pressed together, as indicated by arrows F in FIG. 3. This gap has a transverse thickness $a'$ at the particular illustrated cross-section which thickness may be substantially greater than several mils. In accordance with the invention, the thickness a of material M on surface 20 is at least about 125% of the thickness $a'$ of the largest gap 40 between surfaces 20, 22. In other words, the thickness $a$ of layer M is greater than the thickness $a'$ which is, for illustrative purposes, indicated to be the largest gap between parts 10, 12 and surfaces 20, 22 when the surfaces are clamped together preparatory to welding along area 42 at the flanged portion of seam 30. Of course, a layer M could be placed upon both surfaces 20, 22 and in that instance, each layer could be relatively small so that the combined thickness of the two layers would exceed the thickness $a'$ of the largest gap 40 existing between surfaces 20, 22 when they are held together for seam welding. In practice, the layer of material M is at least about 6–10 mils in thickness. After the parts are held together as shown in FIG. 3, the force indicated by arrows F squeezes material from gap 40 and other areas so that the gaps are filled by the previously mentioned corrosion resistant material. Thereafter, area 42 of seam 30 is welded by standard arc or gas welding equipment to create an elongated bead B extending along area 42 of gap 40. During the welding operation, as best shown in FIG. 3A, metal of parts 10, 12 adjacent area 42 are heated to a temperature sufficient to melt the metal of these parts. This is indicated by the hatched lines H in FIG. 3A which heat causes burning and heat deterioration of the solvent in material M of gap 40. This draws material M from the heated weld area and forms a pliable, heat insulating gel 50 which creates a heat barrier between the heated metal and the remainder of the material M. As material M is subjected to the heat of the metal in area 42, it forms the gel by burning material adjacent bead B. In this manner, a recess or cavity 52 is formed along the weld area, i.e. along bead B. Material M in gap 40, but spaced from bead B, is thus protected from subsequent burning due to the heat created during the welding operation. Thus, the non-hardened material M spaced from elongated cavity 52 remains physically intact. After the welding operation, the material surrounding area 42 is cooled which allows material M to force its way back toward the weld area defined by bead B to reduce the elongated cavity 52 and bring gel 50 in close proximity thereto. Generally this final spacing is less than one-sixteenth of an inch. Thus, during the welding operation, rustproofing of surfaces 20, 22 is not destroyed by burning the rustproofing material from between these surfaces.

Figure 3B:
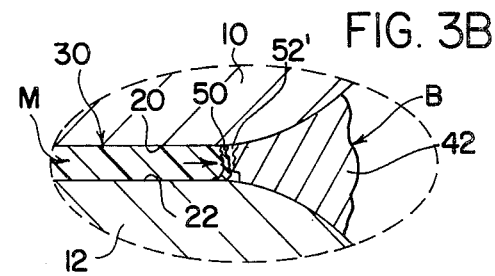
FIG. 3B is a view similar to FIG. 3A showing the corrosion resistant material after the weld bead and adjacent metal area have cooled.
Figure 4:
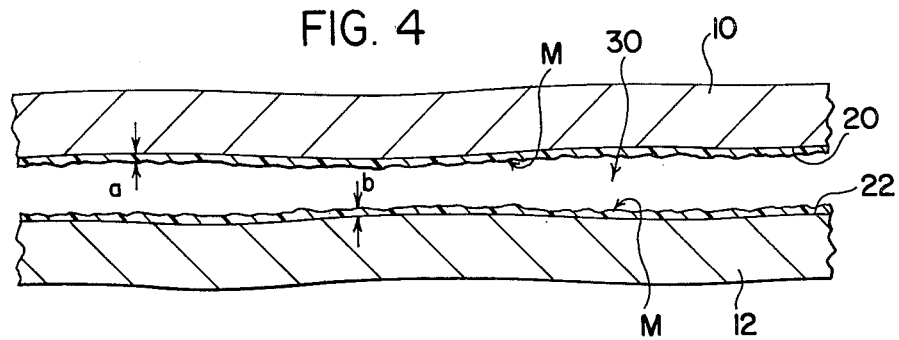
FIG. 4 is an enlarged cross-sectional view illustrating two sheet metal parts to be assembled in accordance with the present invention.
Figure 5:
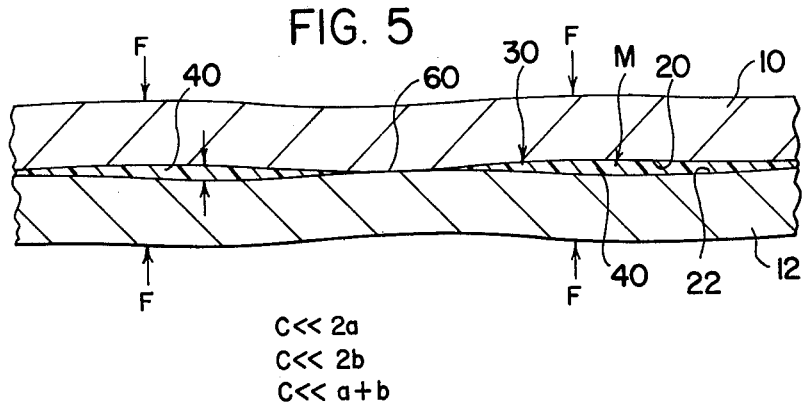
FIG. 5 is a view similar to FIG. 4 showing the two sheet metal parts in the held position preparatory to the welding operation.

Referring now to FIGS. 4 and 5, these figures illustrate the characteristic of the present invention wherein the material M on one or both surfaces 20, 22 fills the gap between the surfaces which exist, except in abutting position or positions 60. When parts 10, 12 are clamped together by a force F as shown in FIG. 5, the material M completely fills all portions of gap or gaps 40 at seam 30. This prevents ingress of moisture during long term exposure to corrosive atmospheres. This concept taken together with the protective concept illustrated in FIGS. 3A-3B provide a sound rustproofing concept, which concept can be used with arc or gas welding operations. When force F is applied to parts 10, 12, excess material M is squeezed from gap or gaps 40. This can be wiped off by an aromatic solvent without inhibiting subsequent processing of exposed surfaces.

Figure 6:
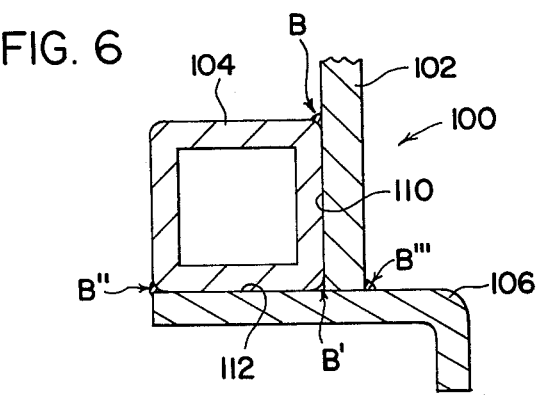
FIG. 6 is an enlarged cross-sectional view showing an assembly to be welded and taken generally along line 6—6 of FIG. 1.
Figure 7:
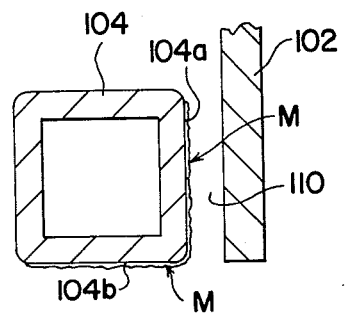
FIGS. 7 and 8 are schematic, enlarged cross-sectional views illustrating operating steps in the process of assembling two components of the assembly illustrated in FIG. 6.
Figure 8:
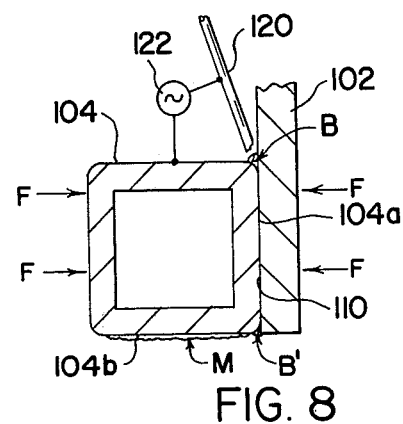
Figure 8A:
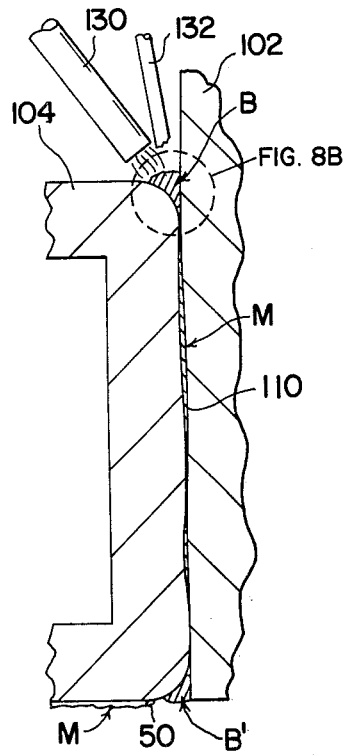
FIG. 8A is an enlarged view similar to FIG. 8 and illustrating a second type of welding operation which can be employed; and, FIG. 8B is a magnified cross-sectional view taken generally in the circled area of FIG. 8A.
Figure 8B:
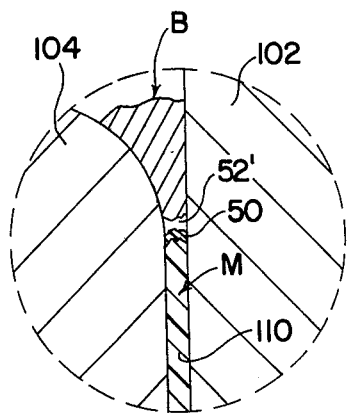

Referring now to FIGS. 6-8, the use of the present invention to weld a channel assembly 100 is set forth. In this instance, assembly 100 includes a side plate 102, arcuate channel 104 and a wheel shield 106. As a first operation, material M is placed upon surfaces 104a-104b of channel 104, as shown in FIG. 7. Thereafter, channel 104 is placed against plate 102 and held there by an appropriate jig or fixture which will create forces indicated by the arrows to hold the channel against plate 102. In many instances, the force must be limited by the geometry of the assembly. Surface 104a coacts with plate 102 to create a seam 110. A similar seam 112 is created between channel 104 and wheel shield 106, as best shown in FIG. 6. Thereafter, an appropriate welding electrode connected between the workpieces 102, 104 and a power supply 122, is moved along the seam between surface 104a and 102 to create a weld bead B. This same bead B could be created by a gas welding process as schematically illustrated in FIG. 8A. A gas torch 130 melts consumable electrode 132 to create bead B. In any instance, the bead is formed by heating the adjacent metals to a melting point and employing a metal to create bead B extending along the seam between plate 102 and channel 104. In a like manner, bead B' is created along the lower seam between these two parts. In each instance, the metal is heated adjacent the periphery of the weld bead to retract from the weld area leaving a clean surface and to create a pliable gel barrier 50. After cooling, a relatively small elongated cavity 52' is formed by the gel barrier, as shown in FIG. 8B. After processing seam 110, seam 112 is created by assembling wheel shield 106 against the preassembled parts 102, 104, as shown in FIG. 6. Before this assembly process, material M is placed within seam 112 and the welding process previously described produces beads B" and B'''. Each of these elongated beads will create the same protective concept previously described with respect to sheet metal parts 10, 12.

It is appreciated that spot welding could be employed for some welding operations. In this instance, the nuggets would create a peripheral surface around which gel would form as the material is burnt and retracts. This is discussed in the prior application incorporated by reference herein. However, the present invention is more particularly directed to a concept allowing the rustproofing of the seam which does not lend itself to spot welding and must be seam welded by continuous bead or an elongated bead of some type which can be created by any equipment, such as a gas or arc welding installation.

The cavity 52' is quite small and essentially excludes moisture from the inside surface of bead B. When flame or arc welding is used, the parts may be of different sizes and each may exceed 0.125 inch in thickness, such as a support channel in vehicle cabs. FIG. 2 illustrates two relatively thin sheets which can be welded by arc, flame (gas) or spot (resistance). FIG. 6 illustrates larger parts, at least channel 104.

Having thus defined the invention, it is claimed:

1. A method of joining first and second sheet metal parts along a common seam formed by a first surface on said first part and a second surface generally matching said first surface and on said second part, said surfaces defining therebetween random spaces of variable thickness when said surfaces are assembled in generally abutting coextensive relationship, said variable thickness being less than a known thickness, said method comprising the steps of:
   (a) applying a layer of corrosion resistant material to one of said surfaces at an applied thickness substantially greater than said known thickness, said material including a suspension of a carrier, a corrosion resistant agent and a carrier solvent and being nongravity flowable at a temperature above about 400° F to 440° F and capable of forming a heat insulating, pliable, coherent gel upon burning of said solvent and being nonhardening;
   (b) placing said surfaces together to jointly form said common seam with said material filling said random spaces;
   (c) holding said surfaces in said placed position;
   (d) welding said surfaces together along a weld line generally coextensive with said seam whereby a line of said gel of said material forms along said weld line.

2. A method as defined in claim 1 wherein said applied thickness is at least 25% greater than said known thickness.

3. A method as defined in claim 2 wherein said applied thickness exceeds about 6 mils.

4. A method as defined in claim 2 wherein said applied thickness exceeds about 10 mils.

5. A method as defined in claim 1 wherein said applied thickness exceeds about 6 mils.

6. A method as defined in claim 1 wherein said applied thickness exceeds about 10 mils.

7. A method as defined in claim 2 including the further step of:
   (e) forcing said surfaces together before said welding step whereby said material is squeezed from between said surfaces.

8. A method as defined in claim 1 including the further step of:

(e) forcing said surfaces together before said welding step whereby said material is squeezed from between said surfaces.

9. A method of joining first and second sheet metal parts along a common seam formed by a first surface on said first part and a second surface generally matching said first surface and on said second part, said surfaces defining therebetween random spaces of variable thickness when said surfaces are assembled in generally abutting coextensive relationship, said variable thickness being less than a known thickness, said method comprising the steps of:
  (a) applying a layer of corrosion resistant material to each of said surfaces, the combined applied thickness of said layers being substantially greater than said known thickness, said material including a suspension of a carrier, a corrosion resistant agent and a carrier solvent and being nongravity flowable at a temperature about 400° F to 440° F and capable of forming a heat insulating, pliable, coherent gel upon burning of said solvent and being nonhardening;
  (b) placing said surfaces together to jointly form said common seam with said material filling said random spaces;
  (c) holding said surfaces in said placed positions;
  (d) welding said surfaces together along a weld line generally coextensive with said seam whereby a line of said gel of said material forms along said weld line.

10. A method as defined in claim 9 wherein said applied thickness is at least 25% greater than said known thickness.

11. A method as defined in claim 10 wherein said applied thickness exceeds about 6 mils.

12. A method as defined in claim 10 wherein said applied thickness exceeds about 10 mils.

13. A method as defined in claim 9 wherein said applied thickness exceeds about 6 mils.

14. A method as defined in claim 9 wherein said applied thickness exceeds about 10 mils.

15. A method as defined in claim 10 including the further step of:
  (e) forcing said surfaces together before said welding step whereby said material is squeezed from between said surfaces.

16. A method as defined in claim 9 including the further step of:
  (e) forcing said surfaces together before said welding step whereby said material is squeezed from between said surfaces.

17. A method of joining first and second sheet metal parts along a common seam formed by a first surface on said first part and a second surface generally matching said first surface and on said second part, said surfaces defining therebetween random spaces of variable thickness when said surfaces are assembled in generally abutting coextensive relationship, said variable thickness being less than a known thickness, said method comprising the steps of:
  (a) applying a non-hardening layer of corrosion resistant material to one of said surfaces at an applied thickness substantially greater than said known thickness, said material being thixotropic and capable of forming a heat insulating, pliable, coherent gel upon being subjected to a given temperature generally sufficient to melt said metal of said parts;
  (b) placing said surfaces together to jointly form said common seam with said material filling said random spaces;
  (c) holding said surfaces in said placed position;
  (d) welding said surfaces together at a temperature at least as high as said given temperature along a weld line generally coextensive with said seam whereby a line of said gel of said material forms along and generally parallel to said weld line.

18. A method as defined in claim 17 wherein said applied thickness is at least 25% greater than said known thickness.

19. A method as defined in claim 18 including the further step of:
  (e) forcing said surfaces together before said welding step whereby said material is squeezed from between said surfaces.

20. A method as defined in claim 17 including the further step of:
  (e) forcing said surfaces together before said welding step whereby said material is squeezed from between said surfaces.

21. A method of joining first and second sheet metal parts along a common seam formed by a first surface on said first part and a second surface generally matching said first surface and on said second part, said surfaces defining therebetween random spaces of variable thickness when said surfaces are assembled in generally abutting coextensive relationship, said variable thickness being less than a known thickness, said method comprising the steps of:
  (a) applying a non-hardening layer of corrosion resistant material to each of said surfaces, the combined applied thickness of said layers being substantially greater than said known thickness, said material being thixotropic and capable of forming a heat insulating, pliable, coherent gel upon being subjected to a given temperature generally sufficient to melt said metal of said parts;
  (b) placing said surfaces together to jointly form said common seam with said material filling said random spaces;
  (c) holding said surfaces in said placed positions;
  (d) welding said surfaces together at a temperature at least as high as said given temperature along a weld line generally coextensive with said seam whereby a line of said gel of said material forms along and generally parallel to said weld line.

22. A method as defined in claim 21 wherein said applied thickness is at least 25% greater than said known thickness.

23. A method as defined in claim 22 wherein said applied thickness exceeds about 6 mils.

24. A method as defined in claim 22 including the further step of:
  (e) forcing said surfaces together before said welding step whereby said material is squeezed from between said surfaces.

25. A method as defined in claim 21 including the further step of:
  (e) forcing said surfaces together before said welding step whereby said material is squeezed from between said surfaces.

26. A method of joining first and second sheet metal parts along a common seam formed by a first surface on said first part and a second surface generally matching said first surface and on said second part, said surfaces defining therebetween random spaces of variable thickness when said surfaces are assembled in generally abutting coextensive relationship, said method comprising the steps of:
 (a) applying a non-hardening layer of corrosion resistant material to at least one of said surfaces, said material being thixotropic, cohesive with said metal and capable of forming a heat insulating, pliable, coherent gel upon being subjected to a given temperature generally sufficient to melt said metal of said parts;
 (b) placing said surfaces together to jointly form said common seam with said material filling said random spaces;
 (c) holding said surfaces in said placed position;
 (d) welding said surfaces together at a temperature at least as high as said given temperature along a weld line generally coextensive with said seam whereby a line of said gel of said material forms along and generally parallel to said weld line.

27. A method of joining first and second sheet metal parts along a common seam formed by a first surface on said first part and a second surface generally matching said first surface and on said second part, said surfaces defining therebetween random spaces of variable thickness when said surfaces are assembled in generally abutting coextensive relationship, said method comprising the steps of:
 (a) applying a non-hardening layer of corrosion resistant material to at least one of said surfaces, said material being thixotropic, cohesive to said metal, and capable of forming a pliable, coherent gel upon being subjected to a given temperature generally sufficient to melt said metal of said parts;
 (b) placing said surfaces together to jointly form said common seam with said material filling said random spaces;
 (c) holding said surfaces in said placed position;
 (d) welding said surfaces together at a temperature at least as high as said given temperature at a periphery defining weld area of said seam whereby a barrier of gel of said material forms along said periphery of said weld area.

28. A method as defined in claim 27 wherein said welding step includes gas welding of said area.

29. A method as defined in claim 27 wherein said welding step includes arc welding of said area.

* * * * *